United States Patent
Surtani

(10) Patent No.: US 8,402,106 B2
(45) Date of Patent: Mar. 19, 2013

(54) ASYNCHRONOUS FUTURE BASED API

(75) Inventor: Manik Surtani, London (GB)

(73) Assignee: Red Hat, Inc., Raleigh, NC (US)

( * ) Notice: Subject to any disclaimer, the term of this patent is extended or adjusted under 35 U.S.C. 154(b) by 259 days.

(21) Appl. No.: 12/760,204

(22) Filed: Apr. 14, 2010

(65) Prior Publication Data

US 2011/0258279 A1    Oct. 20, 2011

(51) Int. Cl.
  *G06F 15/16* (2006.01)
  *G06F 13/00* (2006.01)
(52) U.S. Cl. ........ 709/207; 709/201; 709/202; 709/203; 709/204; 709/205; 709/206; 709/213; 709/214; 709/215; 709/217; 709/219; 709/220; 709/221; 709/222; 709/223; 709/226; 709/230; 709/232; 709/234; 709/236; 709/238; 709/239; 709/245; 711/110; 711/111; 711/112; 711/113; 711/117; 711/118; 711/119; 711/122; 711/130; 711/141; 711/147; 711/148; 711/150; 711/154; 711/161; 711/162; 711/170; 707/999.2; 707/999.201; 707/999.202; 707/999.001; 707/999.01
(58) Field of Classification Search .................. 709/201, 709/202, 203, 213, 214, 215, 217, 219, 220, 709/221, 222, 223, 226, 230, 232, 234, 236, 709/238, 239, 245; 711/100, 111, 112, 113, 711/117, 118, 119, 122, 130, 141, 147, 148, 711/150, 154, 161, 162, 170; 707/999.2, 707/999.201, 999.202, 999.001, 999.01
See application file for complete search history.

(56) References Cited

U.S. PATENT DOCUMENTS

| | | | | |
|---|---|---|---|---|
| 5,394,555 | A * | 2/1995 | Hunter et al. | 711/148 |
| 6,081,876 | A * | 6/2000 | Brewer et al. | 711/163 |
| 6,330,643 | B1 * | 12/2001 | Arimilli et al. | 711/141 |
| 6,587,921 | B2 * | 7/2003 | Chiu et al. | 711/119 |
| 6,751,721 | B1 * | 6/2004 | Webb et al. | 712/10 |
| 6,865,595 | B2 * | 3/2005 | Glasco | 709/206 |
| 6,950,913 | B2 * | 9/2005 | Glasco | 711/152 |
| 6,996,502 | B2 * | 2/2006 | De La Cruz et al. | 702/188 |
| 6,996,674 | B2 * | 2/2006 | Chiu et al. | 711/118 |
| 7,096,213 | B2 * | 8/2006 | Chatterjee et al. | 1/1 |
| 7,103,616 | B1 * | 9/2006 | Harmer et al. | 1/1 |
| 7,103,636 | B2 * | 9/2006 | Glasco | 709/206 |
| 7,103,725 | B2 * | 9/2006 | Glasco | 711/141 |
| 7,107,408 | B2 * | 9/2006 | Glasco | 711/141 |
| 7,107,409 | B2 * | 9/2006 | Glasco | 711/141 |
| 7,171,522 | B2 * | 1/2007 | Watanabe et al. | 711/144 |
| 7,225,244 | B2 * | 5/2007 | Reynolds et al. | 709/223 |
| 7,269,698 | B2 * | 9/2007 | Hum et al. | 711/148 |
| 7,337,279 | B2 * | 2/2008 | Glasco | 711/141 |
| 7,376,796 | B2 * | 5/2008 | Corbett et al. | 711/141 |
| 7,395,379 | B2 * | 7/2008 | Glasco | 711/146 |
| 7,464,223 | B2 * | 12/2008 | Watanabe et al. | 711/114 |
| 7,483,978 | B2 * | 1/2009 | Esfahany et al. | 709/224 |
| 7,503,052 | B2 * | 3/2009 | Castro et al. | 719/328 |

(Continued)

*Primary Examiner* — John Follansbee
*Assistant Examiner* — Saket K Daftuar
(74) *Attorney, Agent, or Firm* — Lowenstein Sandler LLP

(57) ABSTRACT

An apparatus and a method for operating on data at a cache node of a data grid system is described. An asynchronous future-based interface of a computer system receives a request to operate on a cache node of a cluster. An acknowledgment is sent back upon receipt of the request prior to operating on the cache node. The cache node is then operated on based on the request. The operation is replicated to other cache nodes in the cluster. An acknowledgment that the operation has been completed in the cluster is sent back.

14 Claims, 3 Drawing Sheets

U.S. PATENT DOCUMENTS

| | | | |
|---|---|---|---|
| 7,526,519 B2* | 4/2009 | Potter et al. | 709/200 |
| 7,617,257 B2* | 11/2009 | Sathyanarayan et al. | 1/1 |
| 7,650,427 B1* | 1/2010 | Liu et al. | 709/238 |
| 7,698,593 B2* | 4/2010 | Kariv | 714/10 |
| 7,730,258 B1* | 6/2010 | Smith et al. | 711/114 |
| 7,752,397 B2* | 7/2010 | Spink et al. | 711/141 |
| 7,761,677 B2* | 7/2010 | Arakawa et al. | 711/165 |
| 7,792,714 B1* | 9/2010 | Mills et al. | 705/35 |
| 7,962,689 B1* | 6/2011 | Kazar et al. | 711/114 |
| 8,024,306 B2* | 9/2011 | Palliyil et al. | 707/698 |
| 2002/0116485 A1* | 8/2002 | Black et al. | 709/223 |
| 2002/0165961 A1* | 11/2002 | Everdell et al. | 709/225 |
| 2003/0182508 A1* | 9/2003 | Glasco | 711/118 |
| 2003/0182509 A1* | 9/2003 | Glasco | 711/119 |
| 2003/0182514 A1* | 9/2003 | Glasco | 711/141 |
| 2003/0212741 A1* | 11/2003 | Glasco | 709/203 |
| 2003/0225978 A1* | 12/2003 | Glasco | 711/141 |
| 2003/0225979 A1* | 12/2003 | Glasco | 711/141 |
| 2004/0093469 A1* | 5/2004 | Glasco | 711/145 |
| 2004/0260745 A1* | 12/2004 | Gage et al. | 709/200 |
| 2004/0268052 A1* | 12/2004 | Glasco | 711/141 |
| 2005/0125687 A1* | 6/2005 | Townsend et al. | 713/200 |
| 2005/0234936 A1* | 10/2005 | Castro et al. | 707/100 |
| 2005/0262246 A1* | 11/2005 | Menon et al. | 709/226 |
| 2007/0074158 A1* | 3/2007 | Robinson | 717/110 |
| 2007/0101069 A1* | 5/2007 | Corbett et al. | 711/141 |
| 2007/0118694 A1* | 5/2007 | Watanabe et al. | 711/118 |
| 2007/0179981 A1* | 8/2007 | Vincent | 707/200 |
| 2008/0052372 A1* | 2/2008 | Weber et al. | 709/217 |
| 2008/0083036 A1* | 4/2008 | Ozzie et al. | 726/27 |
| 2008/0256306 A1* | 10/2008 | Warner et al. | 711/152 |
| 2009/0031424 A1* | 1/2009 | Ganesan et al. | 726/26 |
| 2009/0248858 A1* | 10/2009 | Sivasubramanian et al. | 709/224 |
| 2009/0275346 A1* | 11/2009 | Bauman et al. | 455/456.2 |
| 2009/0320105 A1* | 12/2009 | Jurkiewicz et al. | 726/5 |
| 2010/0106907 A1* | 4/2010 | Noguchi et al. | 711/114 |
| 2010/0180153 A1* | 7/2010 | Jernigan et al. | 714/6 |
| 2010/0191783 A1* | 7/2010 | Mason et al. | 707/822 |
| 2010/0198985 A1* | 8/2010 | Kanevsky et al. | 709/241 |
| 2010/0199042 A1* | 8/2010 | Bates et al. | 711/114 |
| 2010/0229160 A1* | 9/2010 | Ishizaki | 717/136 |
| 2010/0306275 A1* | 12/2010 | Maheshwari et al. | 707/803 |
| 2010/0318630 A1* | 12/2010 | Howell et al. | 709/218 |
| 2011/0145499 A1* | 6/2011 | Ananthanarayanan et al. | 711/118 |
| 2011/0213931 A1* | 9/2011 | Surtani | 711/119 |
| 2011/0258279 A1* | 10/2011 | Surtani | 709/207 |
| 2011/0276542 A1* | 11/2011 | Whitehouse | 707/688 |

\* cited by examiner

ASYNCHRONOUS FUTURE BASED API

TECHNICAL FIELD

Embodiments of the present invention relate to computing systems, and more particularly, to networked storage.

BACKGROUND

Highly concurrent systems often require high throughput of certain data structures. Traditional locks can be used to enforce mutual exclusion and implement operations on concurrent data structures.

Because changes are not propagated quickly enough, rehashing cannot be accomplished without a blocking process of cluster cache nodes. As such, access to a cluster of cache nodes may be blocked when a cache node is leaving or joining the cluster.

BRIEF DESCRIPTION OF THE DRAWINGS

The present invention is illustrated by way of example, and not by way of limitation, in the figures of the accompanying drawings and in which.

DETAILED DESCRIPTION

Described herein is an apparatus and a method for operating on data at a cache node of a data grid system. An asynchronous future-based interface of a computer system receives a request to operate on a cache node of a cluster. An acknowledgment is sent back upon receipt of the request prior to operating on the cache node. The cache node is then operated on based on the request. The operation is replicated to other cache nodes in the cluster. An acknowledgment that the operation has been completed in the cluster is sent back.

Figures 1, 2:
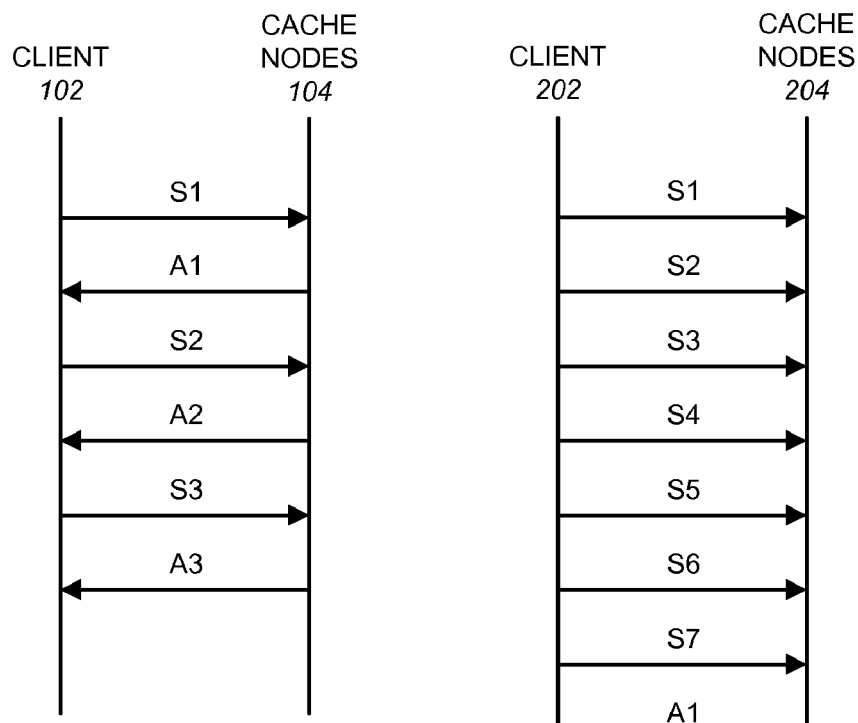
FIG. 1 is a ladder diagram illustrating an asynchronous communication with a blocking approach.
FIG. 2 is a ladder diagram illustrating one embodiment of an asynchronous communication with a future-based API.

FIG. 1 is a block diagram illustrating one embodiment of a system for asynchronous data operation. A client 102 accesses data stored in one of the cache nodes 104 of a cluster of cache nodes in one or more server. Client 102 may, among other functions, read, write, or delete data from cache node 104. In one embodiment, cache node 104 comprises a data grid platform compatible with cache storage. An example of such platform comprises INFINISPAN from Red Hat, Inc.

In one embodiment, cache node 104 belongs to one or more data grids. Data grids are highly concurrent distributed data structures. They typically allow one to address a large amount of memory and store data in a way that it is quick to access. They also tend to feature low latency retrieval, and maintain adequate copies across a network to provide resilience to server failure.

One example of a data grid uses INFINISPAN. INFINISPAN is an extremely scalable, highly available data grid platform written in Java. The purpose of INFINISPAN is to expose a data structure that is highly concurrent, designed ground-up to make the most of modern multi-processor/multi-core architectures while at the same time providing distributed cache capabilities. At its core INFINISPAN exposes a Cache interface. It is also optionally is backed by a peer-to-peer network architecture to distribute state efficiently around a data grid.

High availability is offered via making replicas of state across a network as well as optionally persisting state to configurable cache stores. INFINISPAN also offers enterprise features such as efficient eviction algorithms to control memory usage as well as Java Transaction API (JTA) compatibility.

In addition to the peer-to-peer architecture of INFINISPAN, INFINISPAN has the ability to run farms of INFINISPAN instances as servers and connecting to them using a plethora of clients—both written in Java as well as other popular platforms.

As such, client 102 connects to a cache node 104 to read, write data from data grids formed by INFINISPAN. In one embodiment, client 102 communicate with cache nodes 104 using an asynchronous future-based API interface.

FIG. 1 is a ladder diagram illustrating an asynchronous communication between client 102 and cache nodes 104. In this example, a value is set in the cache node. By the time client 102 gets a response that the value has been set in the cache node, client 102 also needs to know that the value has been replicated to other cache nodes so that redundancy guarantees for high availability.

One way to do this is just to block the thread that calls set( ) until the replication has been performed synchronously to the other node and returns, however that will involve a network roundtrip per set. FIG. 1 illustrates a communication with a blocking approach, where S represents Set in cache, and A represents acknowledgment of replication of Set( ) in cache node. Thus the thread has to wait for the acknowledgment of the set before calling the next set, which involves a network roundtrip per set. It would be thus desirable to be able to get acknowledgments of replication back asynchronously in a difference stream.

FIG. 2 illustrates a ladder diagram of an asynchronous communication involving a non-blocking approach. With a non-blocking (pipelined) approach, the thread call the sets in a quick succession without waiting for a response, then some time later, the thread gets the acknowledgment back.

For example, calls S1-S11 are placed in quick succession without waiting for an acknowledgment of replication of set( ) in cache node 204. Acknowledgments A1-A5 are sent back as they are being processed. Since there is no blocking, one can use the throughput of the network without being limited by its latency. As such, when someone sends a load of messages one by one, the system doesn't individually do a network RTT per message because it would be too slow to replicate them. However, client 102 still needs the guarantee that the message has reached the all the cache nodes before they get the acknowledgment of send back.

Figure 3:
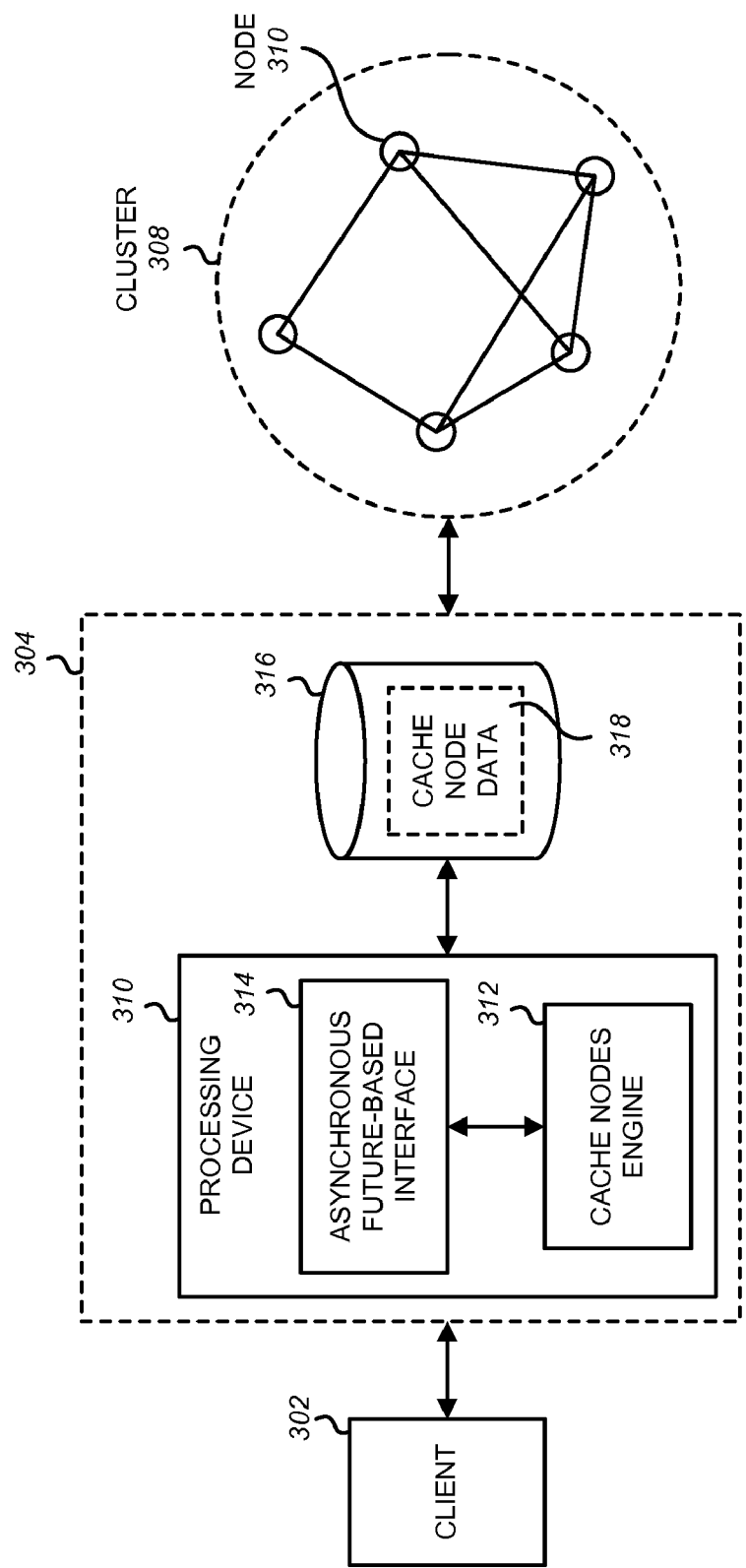
FIG. 3 is a block diagram illustrating one embodiment of a system for a future-based asynchronous cache API.

FIG. 3 illustrates a system for implementing the asynchronous communication as illustrated in FIG. 2. A client 302 communicates with a server 304 via a network (e.g. the Internet) to access data from a cluster 308 of cache nodes 310.

In one embodiment, server 304 comprises a processing device 310 and a local cache node 316. The processing device 310 has an asynchronous future-based API (Application Programming Interface) 314 and a cache nodes engine 312. Cache nodes engine 312 is configured to operate and communicate with a data grid formed from cache node cluster 308. Cache node cluster 308 can also include local cache node 318. For example, server 304 may include an INFINISPAN module that can be run on one or several computing machines. Client 302 can then communicate with cluster 308 via asynchronous future-based API 314.

Processing device 310 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 310 may also be one or more special-purpose processing devices such as an application specific integrated circuit (ASIC), a field programmable gate array (FPGA), a digital signal processor (DSP), network processor, or the like.

In one embodiment, asynchronous future-based API 314 allows INFINISPAN module and client 302 to perform other operations or processes without having to wait for data to be completely operated on in cluster 308. In other words, a thread is not needed to be kept open until the operation is finished.

In one embodiment, asynchronous future-based API 314 enables non-blocking access to data in data grids formed form cluster 308. Conventionally, a thread is needed for each connection (e.g. 100 threads for 100 connections). However, with a non-blocking interface, a smaller number of threads can be used for more connections (e.g. 3 threads for 100 connections).

Server 304 comprises a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. Further, while only a single machine is illustrated, the term "machine" shall also be taken to include any collection of machines that individually or jointly execute a set (or multiple sets) of instructions to perform any one or more of the methodologies discussed herein.

Cache nodes 310 of cluster 308 may reside on computer-accessible storage medium of one or more data storage devices of one or more servers. In one embodiment, local cache node data 318 resides in local storage device 316 of server 304. Storage device 316 can include a memory or a data storage device. Memory can include a read-only memory (ROM), flash memory, dynamic random access memory (DRAM) such as synchronous DRAM (SDRAM), or a static memory (e.g., flash memory, static random access memory (SRAM), etc.). Data storage device may include a computer-accessible storage medium on which is stored one or more sets of instructions embodying any one or more of the methodologies or functions described herein.

Asynchronous future-based API 314 and cache nodes engine 312 may also reside, completely or at least partially, within a main memory and/or within the processing device 310 during execution thereof by the computer system 304, the main memory and the processing device 310 also constituting computer-accessible storage media. The software may further be transmitted or received over a network via the network interface device.

While the computer-accessible storage medium is shown in an exemplary embodiment to be a single medium, the term "computer-accessible storage medium" should be taken to include a single medium or multiple media (e.g., a centralized or distributed database, and/or associated caches and servers) that store the one or more sets of instructions. The term "computer-accessible storage medium" shall also be taken to include any medium that is capable of storing, encoding or carrying a set of instructions for execution by the machine and that cause the machine to perform any one or more of the methodologies of the present invention. The term "computer-accessible storage medium" shall accordingly be taken to include, but not be limited to, solid-state memories, optical and magnetic media.

Figure 4:
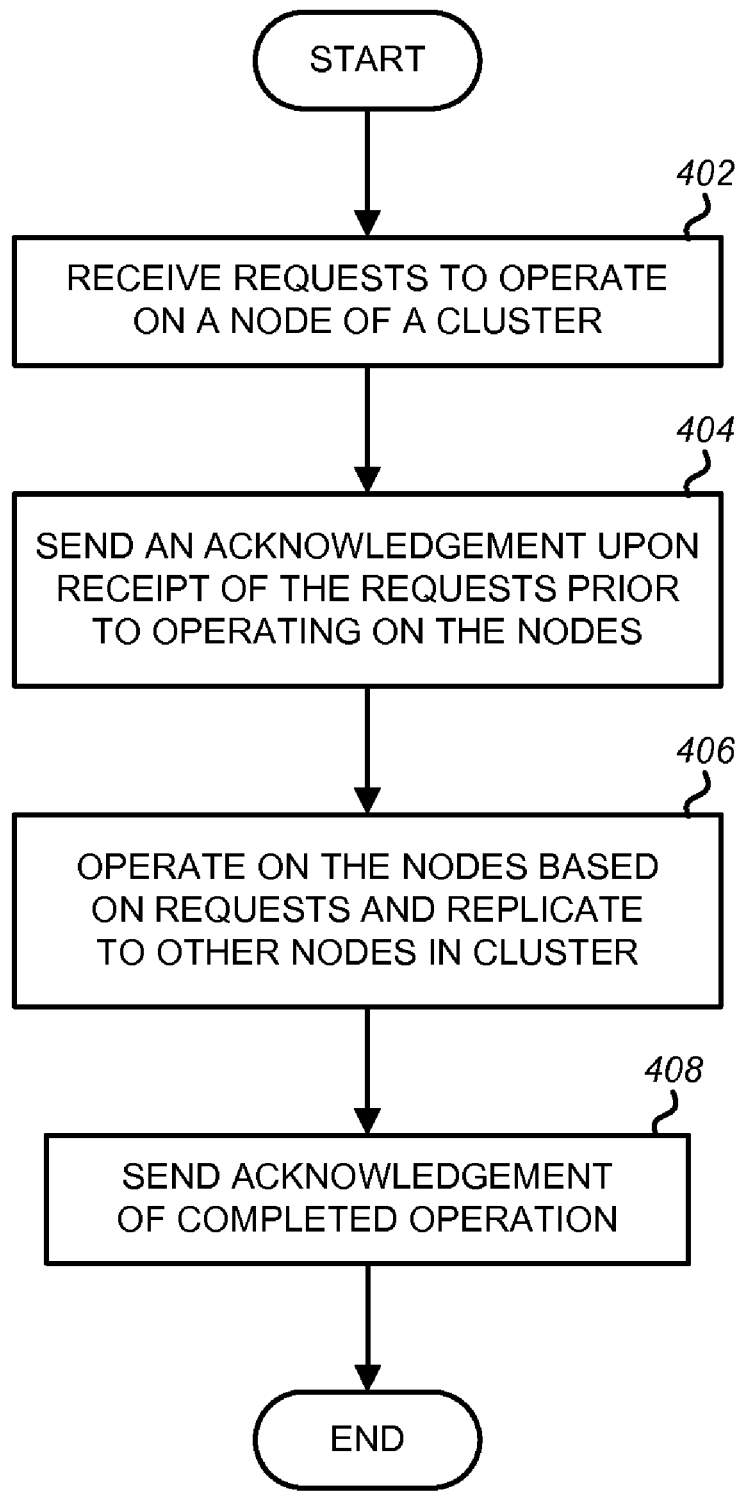
FIG. 4 is a flow diagram illustrating one embodiment of a method for a future-based asynchronous cache API.

FIG. 4 is a flow diagram illustrating one embodiment of a method for asynchronous future-based API. To sum things up, this new API—additional methods on Cache—allow for asynchronous versions of put( ), putIfAbsent( ), putAll( ), remove( ), replace( ), clear( ) and their various overloaded forms. In one embodiment, they are referred to as putAsync( ), putIfAbsentAsync( ), etc. These new methods return a Future rather than the expected return type.

A Future represents the result of an asynchronous computation. Methods are provided to check if the computation is complete, to wait for its completion, and to retrieve the result of the computation. The result can only be retrieved using method get when the computation has completed, blocking if necessary until it is ready. Cancellation is performed by the cancel method. Additional methods are provided to determine if the task completed normally or was cancelled. Once a computation has completed, the computation cannot be cancelled.

The following illustrates an example of a source code for an API to return a future:

V put(K key, V value);
Future<V>putAsync(K key, V value);
boolean remove(K key, V value);
Future<Boolean>removeAsync(K key, V value);
void clear( );
Future<Void>clearAsync As illustrated above, these methods do not block. They return immediately. If return values are needed, one simply waits until the operation completes. A Future.get( ) will block until the call completes. This is useful because, in the case of clustered caches, it allows one to get the best of both worlds when it comes to synchronous and asynchronous mode transports.

Synchronous transports are normally recommended because of the guarantees they offer—the caller always knows that a call has properly propagated across the network, and is aware of any potential exceptions. However, asynchronous transports give greater parallelism. One can start on the next operation even before the first one has made it across the network. But this is at a cost: losing out on the knowledge that a call has safely completed. However with the present future-based cache API, it is possible to know that the call has been safely completed. The following is an example of the asynchronous future-based API:

Cache<String, String>cache=getCache( );
Future<String>f1=cache.putAsync(k1, v1);
Future<String>f2=cache.putAsync(k2, v2);
Future<String>f3=cache.putAsync(k3, v3);
f1.get( );
f2.get( );
f3.get( );

The network calls—possibly the most expensive part of a clustered write—involved for the 3 put calls can now happen in parallel. This is even more useful if the cache is distributed, and k1, k2 and k3 map to different nodes in the cluster—the processing required to handle the put operation on the remote nodes can happen simultaneously, on different nodes. And all the same, when calling Future.get( ), it is blocked until the calls have completed successfully. And the system is aware of any exceptions thrown. With this approach, elapsed time taken to process all 3 puts should only be as slow as the single, slowest put( ).

At 402, a server receives a request to operate on a cache node of a cluster at an asynchronous future-based interface of a computer system. An acknowledgment is sent at 404 upon receipt of the request prior to operating on the nodes. At 406, the cache node are operated on based on the request. The operation is replicated to the other cache nodes in the cluster. At 408, an acknowledgment that the operation has been completed in the cluster is returned.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "operating" or "copying" or "receiving" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
   receiving, at a server, a request to operate on a first cache node of a cluster of cache node separate from the server at an asynchronous future-based application programming interface of the server,
   wherein the request to operate on the first cache node comprises a future get call, all other calls are blocked until the future get call has been successfully completed,
   wherein the all other calls comprises an asynchronous version of the following commands: put, put if absent, put all, remove, replace, and clear;
   sending an acknowledgment upon receipt of the request prior to operating on the first cache nodes;
   performing an operation on the first cache node based on the request with a cache nodes engine of the server;
   replicating the operation to the other cache nodes in the cluster of cache nodes; and
   sending an acknowledgment that the operation on the first cache node in the cluster has been completed.

2. The computer-implemented method of claim 1 wherein the asynchronous future-based application programming interface is configured to enable a requesting thread to perform at least one other operation at the first cache node pending operation on the first cache node based on the request.

3. The computer-implemented method of claim 1 further comprising:
   returning a future return type in response to the request to guarantee that a message has reached a backup before an acknowledgment is sent back.

4. The computer-implemented method of claim 1 wherein one or more cache nodes of the cluster of cache nodes belong to a data grid system, each cache node replicated to a limited number of cache nodes in the data grid system.

5. The computer-implemented method of claim 4 wherein the data grid system operates on a single server or a plurality of servers.

6. A non-transitory computer-readable storage medium, having instructions stored therein, which when executed, cause a computer system to perform a method comprising:
   receiving, at a server, a request to operate on a first cache node of a cluster of cache node separate from the server at an asynchronous future-based application programming interface of the server,
   wherein the request to operate on the first cache node comprises a future get call, all other calls are blocked until the future get call has been successfully completed,
   wherein the all other calls comprises an asynchronous version of the following commands: put, put if absent, put all, remove, replace and clear;
   sending an acknowledgment upon receipt of the request prior to operating on the first cache nodes;
   performing an operation on the first cache node based on the request with a cache nodes engine of the server;
   replicating the operation to the other cache nodes in the cluster of cache nodes; and sending an acknowledgment that the operation on the first cache node in the cluster has been completed.

7. The non-transitory computer-readable storage medium of claim 6 wherein the asynchronous future-based application programming interface is configured to enable a requesting thread to perform at least one other operation at the first cache node pending operation on the first cache node based on the request.

8. The non-transitory computer-readable storage medium of claim 6 wherein the method further comprises:
returning a future return type in response to the request to guarantee that a message has reached a backup before an acknowledgment is sent back.

9. The non-transitory computer-readable storage medium of claim 6 wherein one or more cache nodes of the cluster of cache nodes belong to a data grid system, each cache node replicated to a limited number of cache nodes in the data grid system.

10. The non-transitory computer-readable storage medium of claim 9 wherein the data grid system operates on a single server or a plurality of servers.

11. A computer system comprising:
a storage device configured to store at least one cache node of a cluster of cache nodes; and
a server coupled to the storage device, the server comprising an asynchronous future-based interface, the asynchronous future-based application programming interface configured to receive at the server,
a request to operate on a first cache node of the cluster of cache nodes separate from the server,
wherein the request to operate on the first cache node comprises a future get call, all other calls are blocked until the future get call has been successfully completed,
wherein the all other calls comprises an asynchronous version of the following commands: put, put if absent, put all, remove, replace and clear;
to send an acknowledgment upon receipt of the request prior to operating on the first cache node,
to perform an operation on the first cache node based on the request with a cache nodes engine of the server,
to replicate the operation to the other cache nodes in the cluster of cache nodes, and
to send an acknowledgment that the operation on the first cache node in the duster has been completed.

12. The computer system of claim 11 wherein the asynchronous future-based application programming interface is configured to enable a requesting thread to perform at least one other operation at the first cache node pending operation on the first cache node based on the request.

13. The system of claim 11 wherein the asynchronous future-based interface is configured to return a future return type in response to the request to guarantee that a message has reached a backup before an acknowledgment is sent back.

14. The computer system of claim 11 wherein one or more cache nodes of the cluster of cache nodes belong to a data grid system, each cache node replicated to a limited number of cache nodes in the data grid system.

* * * * *